United States Patent
Mordechay et al.

(10) Patent No.: US 12,390,999 B2
(45) Date of Patent: Aug. 19, 2025

(54) SYSTEM FOR IMPROVING SAFETY IN THREE-DIMENSIONAL PRINTING

(71) Applicant: Stratasys Ltd., Rehovot (IL)

(72) Inventors: Dan Mordechay, Mazkeret Batya (IL); Barak Glassman, Ness Ziona (IL); Kiril Lain, Rehovot (IL)

(73) Assignee: Stratasys Ltd., Rehovot (IL)

( * ) Notice: Subject to any disclaimer, the term of this patent is extended or adjusted under 35 U.S.C. 154(b) by 312 days.

(21) Appl. No.: 17/909,767

(22) PCT Filed: Apr. 27, 2021

(86) PCT No.: PCT/IL2021/050488
§ 371 (c)(1),
(2) Date: Sep. 7, 2022

(87) PCT Pub. No.: WO2021/220275
PCT Pub. Date: Nov. 4, 2021

(65) Prior Publication Data
US 2023/0108185 A1 Apr. 6, 2023

Related U.S. Application Data

(60) Provisional application No. 63/015,699, filed on Apr. 27, 2020.

(51) Int. Cl.
*B29C 64/30* (2017.01)
*B29C 64/112* (2017.01)
(Continued)

(52) U.S. Cl.
CPC ............ *B29C 64/30* (2017.08); *B29C 64/112* (2017.08); *B29C 64/241* (2017.08); *B29C 64/25* (2017.08); *B33Y 10/00* (2014.12); *B33Y 30/00* (2014.12)

(58) Field of Classification Search
CPC ..... B29C 64/30; B29C 64/112; B29C 64/241; B29C 64/25; B33Y 10/00; B33Y 30/00;
(Continued)

(56) References Cited

U.S. PATENT DOCUMENTS 2,518,548 A * 8/1950 Howland .............. F26B 25/009
74/609
2,844,239 A * 7/1958 Batson ..................... B04B 7/06
200/80 R
(Continued)

FOREIGN PATENT DOCUMENTS

CN 104875392 A * 9/2015
CN 205631397 U * 10/2016
(Continued)

OTHER PUBLICATIONS

Communication Pursuant to Article 94(3) EPC Dated Feb. 28, 2024 From the European Patent Office Re. Application No. 21726208.8. (6 Pages).
(Continued)

*Primary Examiner* — Allen L Parker
*Assistant Examiner* — Martin Antonio Asmat Uceda

(57) ABSTRACT

A safety system, for a rotary tray of a three-dimensional printing system comprises a latch having a lock member and being operable to assume a locked state in which the latch prevents the door of the printing system from closing while the lock member prevents the tray from rotating, and an unlocked state in which the latch allows the door to close while the lock member allows the tray to rotate.

11 Claims, 10 Drawing Sheets

(51) Int. Cl.
*B29C 64/241* (2017.01)
*B29C 64/25* (2017.01)
*B33Y 10/00* (2015.01)
*B33Y 30/00* (2015.01)

(58) Field of Classification Search
CPC .......... B33Y 99/00; B22F 12/38; B22F 12/37; B04B 3/00; B04B 5/00; B29B 17/00; E06B 3/00; E06B 5/00; E06B 7/00; E06B 9/00; E06B 11/00; E05F 1/00; E05F 3/00; E05F 5/00; E05F 7/00; E05F 9/00; E05F 11/00; E05F 15/00; E05F 15/40
See application file for complete search history.

(56) References Cited

U.S. PATENT DOCUMENTS

| | | | | |
|---|---|---|---|---|
| 3,678,715 A * | 7/1972 | Funk | ........................ | D06F 37/10 210/360.1 |
| 3,763,670 A * | 10/1973 | Harrold | .................... | D06F 37/42 192/136 |
| 3,899,204 A * | 8/1975 | Ulrich | ..................... | D06F 37/42 68/12.26 |
| 4,418,950 A | 12/1983 | Penhasi | | |
| 4,742,598 A * | 5/1988 | Bruneau | ................ | E05F 1/1066 16/322 |
| 4,982,474 A * | 1/1991 | Kjellstrom | .............. | E05C 17/04 16/83 |
| 5,109,763 A * | 5/1992 | Morris | .................... | B30B 9/321 100/98 R |
| 5,131,515 A * | 7/1992 | Scamardo | .................... | D01G 31/00 19/0.2 |
| 5,484,382 A * | 1/1996 | Frederick | ................ | B01D 41/04 494/12 |
| 5,834,036 A * | 11/1998 | Ueno | ...................... | B29C 45/84 425/153 |
| 6,259,962 B1 | 7/2001 | Gothait | | |
| 6,569,373 B2 | 5/2003 | Napadensky | | |
| 6,658,314 B1 | 12/2003 | Gothait | | |
| 6,850,334 B1 | 2/2005 | Gothait | | |
| 7,183,335 B2 | 2/2007 | Napadensky | | |
| 7,209,797 B2 | 4/2007 | Kritchman et al. | | |
| 7,225,045 B2 | 5/2007 | Gothait et al. | | |
| 7,300,619 B2 | 11/2007 | Napadensky et al. | | |
| 7,331,617 B2 * | 2/2008 | Johnson | .............. | E05B 65/0071 312/238 |
| 7,364,686 B2 | 4/2008 | Kritchman et al. | | |
| 7,500,846 B2 | 3/2009 | Eshed et al. | | |
| 7,500,942 B2 * | 3/2009 | Takahashi | ................. | B04B 7/06 494/12 |
| 7,658,976 B2 | 2/2010 | Kritchman | | |
| 7,962,237 B2 | 6/2011 | Kritchman | | |
| 8,225,458 B1 * | 7/2012 | Hoffberg | ................. | E05F 15/73 16/84 |
| 8,359,790 B2 * | 1/2013 | Shin | .......................... | E05F 5/00 49/31 |
| 8,595,899 B2 * | 12/2013 | McRoskey | .............. | E05F 5/003 16/83 |
| 9,031,680 B2 | 5/2015 | Napadensky | | |
| 9,141,076 B2 * | 9/2015 | Yuzawa | ............. | G03G 21/1633 |
| 9,228,390 B2 * | 1/2016 | Lee | ........................... | E06B 7/28 |
| 9,383,061 B2 * | 7/2016 | Matsumoto | ........ | B23Q 11/0092 |
| 9,808,864 B2 * | 11/2017 | Kawada | .................. | B22F 10/28 |
| 9,909,347 B2 * | 3/2018 | Warburton | .............. | B60J 5/103 |
| 10,202,789 B2 * | 2/2019 | Sowter | .................... | E05C 17/30 |
| 10,571,377 B2 * | 2/2020 | Greenfield | ............... | G01N 3/22 |
| 10,611,136 B2 | 4/2020 | Menchik | | |
| 10,850,327 B2 * | 12/2020 | Riva | ...................... | B28B 1/001 |
| 11,060,322 B2 * | 7/2021 | Lin | ........................ | E05C 19/10 |
| 11,260,449 B2 * | 3/2022 | Herrmann | ............. | B22F 12/222 |
| 11,273,496 B2 * | 3/2022 | Pan | ........................ | B23K 26/34 |
| 11,273,607 B2 * | 3/2022 | Olausson | .............. | B29C 64/393 |
| 11,325,309 B2 * | 5/2022 | Cuyt | ....................... | B29C 64/25 |
| 11,421,471 B2 * | 8/2022 | Roe | ............................ | E06B 9/00 |
| 11,673,331 B2 * | 6/2023 | Swier | ..................... | B29C 64/321 425/375 |
| 12,128,620 B2 * | 10/2024 | Shnell | .................. | B29C 64/245 |
| 2004/0005182 A1 * | 1/2004 | Gaylo | .................. | B22F 12/226 400/283 |
| 2005/0248466 A1 * | 11/2005 | Ghazarian | ................ | B60J 10/00 340/545.1 |
| 2012/0043770 A1 * | 2/2012 | Lau | ....................... | E05C 17/025 292/343 |
| 2013/0040091 A1 | 2/2013 | Dikovsky | | |
| 2014/0271328 A1 * | 9/2014 | Burris | .................. | B23K 26/034 419/53 |
| 2017/0362766 A1 * | 12/2017 | Cho | ........................ | D06F 34/20 |
| 2019/0061249 A1 * | 2/2019 | Lee | ........................ | E05B 43/005 |
| 2019/0329488 A1 | 10/2019 | Ravich et al. | | |
| 2020/0016813 A1 * | 1/2020 | Maki | ...................... | B29C 45/84 |
| 2020/0262140 A1 * | 8/2020 | Zaiss | ....................... | B29C 64/245 |
| 2021/0039114 A1 * | 2/2021 | Ooyama | .................. | B04B 7/06 |
| 2022/0105686 A1 * | 4/2022 | You | ........................ | C12M 21/08 |
| 2022/0402206 A1 * | 12/2022 | Rodriguez Fernandez | ................ | B33Y 30/00 |

FOREIGN PATENT DOCUMENTS

| | | | | |
|---|---|---|---|---|
| CN | 106217885 A | * | 12/2016 | ............ B33Y 30/00 |
| CN | 106239921 A | * | 12/2016 | |
| CN | 106808693 A | * | 6/2017 | ............ B33Y 40/00 |
| EP | 2732912 | | 5/2014 | |
| JP | 2017520434 A | * | 7/2017 | |
| WO | WO 2021/220275 | | 11/2021 | |

OTHER PUBLICATIONS

Notice of Reason(s) for Rejection Dated Jan. 28, 2025 From the Japan Patent Office Re. Application No. 2022-563107 and Its Translation Into English. (6 Pages).
Office Action Dated Feb. 24, 2025 From the Israel Patent Office Re. Application No. 297710. (3 Pages).
International Search Report and the Written Opinion Dated Jun. 30, 2021 From the International Searching Authority Re. Application No. PCT/IL2021/050488. (19 Pages).
International Preliminary Report on Patentability Dated Nov. 10, 2022 From the International Bureau of WIPO Re. Application No. PCT/IL2021/050488. (12 Pages).

\* cited by examiner

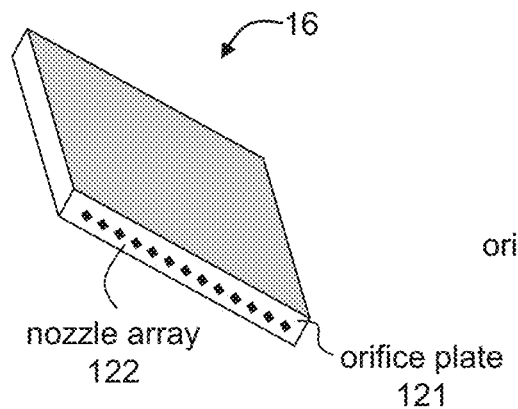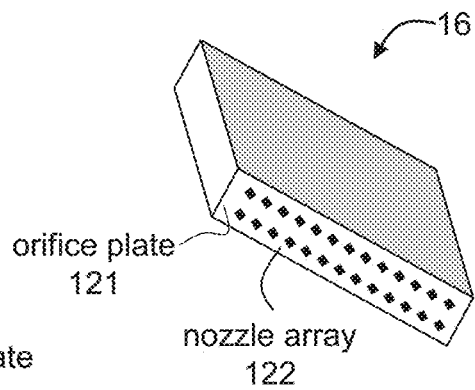
FIG. 2A  FIG. 2B
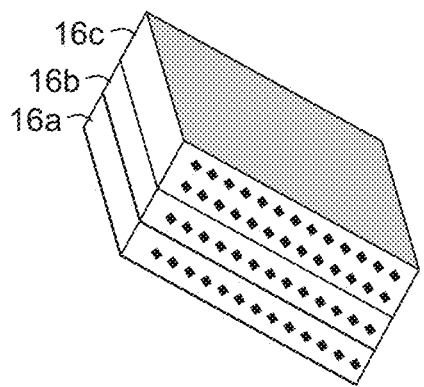
FIG. 2C

SYSTEM FOR IMPROVING SAFETY IN THREE-DIMENSIONAL PRINTING

RELATED APPLICATIONS

This application is a National Phase of PCT Patent Application No. PCT/IL2021/050488 having International filing date of Apr. 27, 2021, which claims the benefit of priority under 35 USC § 119(e) of U.S. Provisional Patent Application No. 63/015,699 filed on Apr. 27, 2020. The contents of the above applications are all incorporated by reference as if fully set forth herein in their entirety.

FIELD AND BACKGROUND OF THE INVENTION

The present invention, in some embodiments thereof, relates to three-dimensional printing and, more particularly, but not exclusively, to a system for improving safety in three-dimensional printing.

Additive manufacturing (AM) is generally a process in which a three-dimensional (3D) object is manufactured utilizing a computer model of the object. Such a process is used in various fields, such as design related fields for purposes of visualization, demonstration and mechanical prototyping, as well as for rapid manufacturing.

The basic operation of any additive manufacturing system consists of slicing a three-dimensional computer model into thin cross sections, translating the result into two-dimensional position data and feeding the data to control equipment which manufactures a three-dimensional structure in a layerwise manner.

Additive manufacturing entails many different approaches to the method of fabrication, including three-dimensional printing, e.g., three-dimensional inkjet printing, laminated object manufacturing, fused deposition modeling and others.

In three-dimensional printing processes, for example, a building material is dispensed from a dispensing head having a set of nozzles to deposit layers of building material on a supporting structure. Depending on the building material, the layers may then be cured or solidified using a suitable device. The building material may include modeling material, which forms the object, and support material, which supports the object as it is being built. Various three-dimensional printing techniques exist and are disclosed in, e.g., U.S. Pat. Nos. 6,259,962, 6,569,373, 6,658,314, 6,850,334, 7,183,335, 7,209,797, 7,225,045, 7,300,619, 7,364,686, 7,500,846, 7,658,976, 7,962,237, 9,031,680, and 10,611,136, U.S. Published Application No. US 20130040091, all of the same Assignee, the contents of which are hereby incorporated by reference.

For example, U.S. Pat. No. 10,611,136 discloses a three-dimensional printing system with a rotary tray configured to rotate about a vertical axis, a printing head having a plurality of separated nozzles, and a controller configured for controlling the inkjet printing heads to dispense, during the rotation, droplets of building material in layers. The system also includes a leveling device that straightens the newly formed layer prior to the formation of successive layer thereon.

SUMMARY OF THE INVENTION

According to an aspect of some embodiments of the present invention there is provided a safety system, suitable for a rotary tray of a three-dimensional printing system, which comprises a printing head, a controller, and a printing chamber with an access opening. The safety system comprises a latch having a lock member and being operable to assume a locked state in which the latch prevents the door from closing while the lock member prevents the tray from rotating, and an unlocked state in which the latch allows the door to close while the lock member allows the tray to rotate. The safety system optionally and preferably comprises a door state sensor, configured for transmitting to the controller a signal indicative whether a door at the access opening is open or closed.

According to some embodiments of the invention the invention the safety system comprises a sprocket wheel connected to the tray to rotate therewith, wherein the lock member engages the sprocket wheel in the locked state, and disengages from the sprocket wheel in the unlocked state.

According to some embodiments of the invention the latch is operable to reciprocally slide radially with respect to the tray, wherein when the latch is extracted outwardly the latch assumes the locked state, and when the latch is retracted inwardly the latch assumes the unlocked state.

According to some embodiments of the invention the latch protrudes out of the access opening when extracted outwardly, thereby preventing the door from closing.

According to some embodiments of the invention the safety system comprises a spring constituted to bias the latch to maintain the locked state upon activation of the latch.

According to some embodiments of the invention safety system comprises an elastic lever connected to the latch in a manner that when the lever is in a relaxed state, the lever collides with a stopper element and prevents the latch from assuming the unlocked state, and when the lever is in a strained state the lever bypasses the stopper element allowing the latch to assume the unlocked state.

According to some embodiments of the invention a height of the lock member is selected to support the tray in the locked state. According to some embodiments of the invention a height of the lock member is selected to support the tray in the locked state but not in the unlocked state.

According to some embodiments of the invention the latch is a push-push latch.

According to an aspect of some embodiments of the present invention there is provided a three-dimensional printing system, comprising a printing head, a rotary tray, a controller, a printing chamber with an access opening, and the safety system as delineated above and optionally and preferably as further detailed below.

According to an aspect of some embodiments of the present invention there is provided a method of printing a three-dimensional object. The method comprises: receiving three-dimensional printing data corresponding to the shape of the object, feeding the data to the three-dimensional printing system, operating the three-dimensional printing system to print the object, opening the door of the printing chamber, activating the latch to lock the tray, and removing the object from the tray.

According to an aspect of some embodiments of the present invention there is provided a system for three-dimensional printing. The system comprises a rotary tray configured to rotate horizontally about a vertical axis, a printing head configured for dispensing a building material, a leveling device for straightening building material dispensed by the printing head, a supporting roller, positioned under the tray below the leveling device, for absorbing a force applied by the leveling device, and a controller configured for controlling the printing head to print a three-dimensional object on the tray;

According to some embodiments of the invention the three-dimensional printing system comprises a latch, having a lock member and being operable to assume a locked state in which the lock member prevents the tray from rotating, and an unlocked state in which the lock member allows the tray to rotate.

According to some embodiments of the invention a height and shape of the lock member is selected to at least partially absorb vertical forces exerted on the tray.

According to some embodiments of the invention the latch is a push-push latch.

According to some embodiments of the invention the latch comprises a lever and a stopper element.

According to some embodiments of the invention the lever comprises a metal sheet and the stopper element comprises a screw head.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

Implementation of the method and/or system of embodiments of the invention can involve performing or completing selected tasks manually, automatically, or a combination thereof. Moreover, according to actual instrumentation and equipment of embodiments of the method and/or system of the invention, several selected tasks could be implemented by hardware, by software or by firmware or by a combination thereof using an operating system.

For example, hardware for performing selected tasks according to embodiments of the invention could be implemented as a chip or a circuit. As software, selected tasks according to embodiments of the invention could be implemented as a plurality of software instructions being executed by a computer using any suitable operating system. In an exemplary embodiment of the invention, one or more tasks according to exemplary embodiments of method and/or system as described herein are performed by a data processor, such as a computing platform for executing a plurality of instructions. Optionally, the data processor includes a volatile memory for storing instructions and/or data and/or a non-volatile storage, for example, a magnetic hard-disk and/or removable media, for storing instructions and/or data. Optionally, a network connection is provided as well. A display and/or a user input device such as a keyboard or mouse are optionally provided as well.

BRIEF DESCRIPTION OF THE SEVERAL VIEWS OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings:

FIGS. 2A-2C are schematic illustrations of printing heads according to some embodiments of the present invention;

DESCRIPTION OF SPECIFIC EMBODIMENTS OF THE INVENTION

Figure 1A:
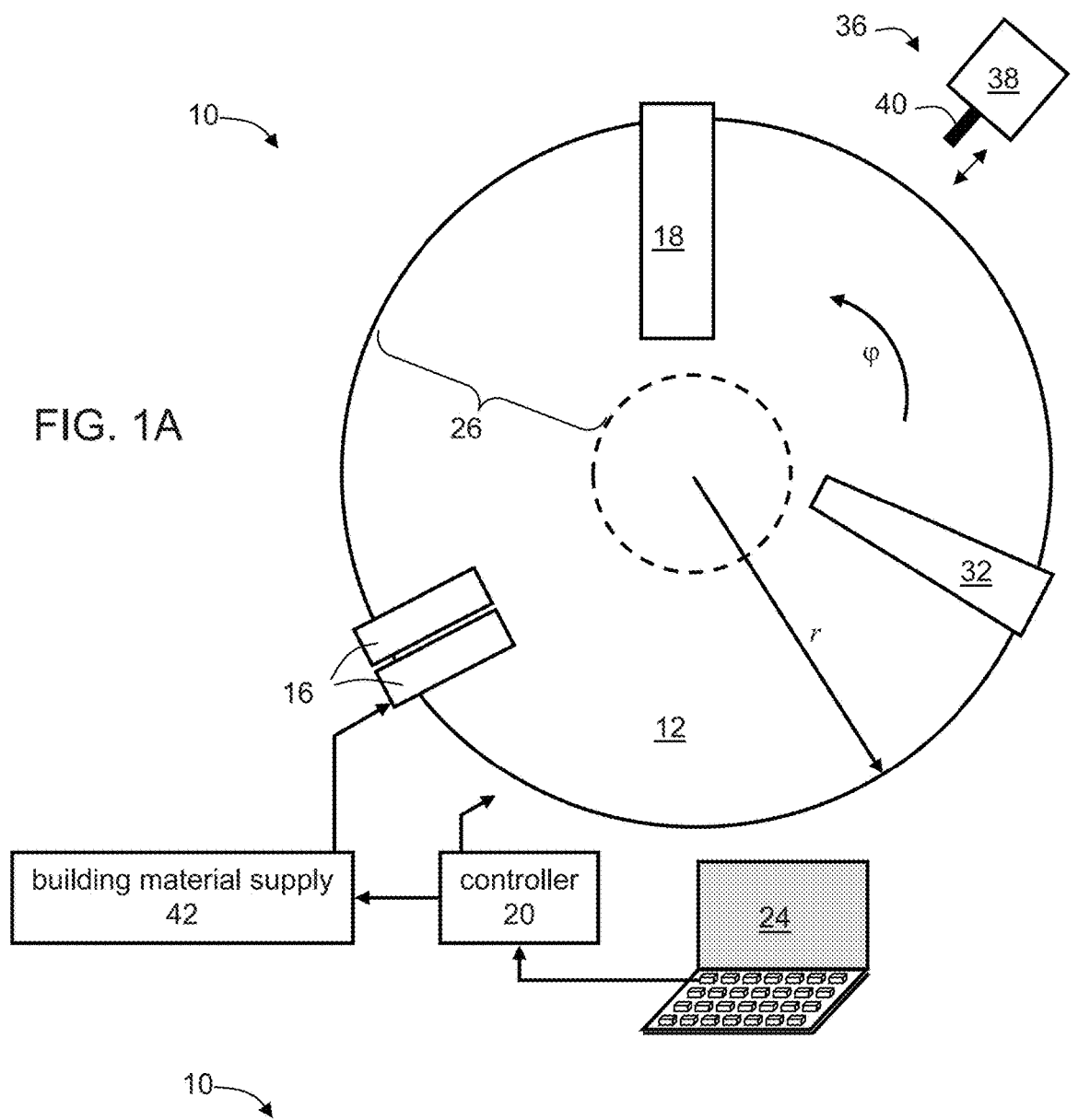
FIGS. 1A-C are schematic illustrations of an additive manufacturing system according to some embodiments of the invention.

The present invention, in some embodiments thereof, relates to three-dimensional printing and, more particularly, but not exclusively, to a system for improving safety in three-dimensional printing.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

The method and system of the present embodiments manufacture three-dimensional objects based on computer object data in a layerwise manner by forming a plurality of layers in a configured pattern corresponding to the shape of the objects. The computer object data can be in any known format, including, without limitation, a Standard Tessellation Language (STL) or a StereoLithography Contour (SLC) format, Virtual Reality Modeling Language (VRML), Additive Manufacturing File (AMF) format, Drawing Exchange Format (DXF), Polygon File Format (PLY) or any other format suitable for Computer-Aided Design (CAD).

The term "object" as used herein refers to a whole object or a part thereof.

Each layer is formed by an additive manufacturing apparatus which scans a two-dimensional surface and patterns it. While scanning, the apparatus visits a plurality of target locations on the two-dimensional layer or surface, and decides, for each target location or a group of target locations, whether or not the target location or group of target locations is to be occupied by building material formulation, and which type of building material formulation is to be delivered thereto. The decision is made according to a computer image of the surface.

In preferred embodiments of the present invention the AM comprises three-dimensional printing, more preferably three-dimensional inkjet printing. In these embodiments a building material formulation is dispensed from a printing head having one or more arrays of nozzles to deposit building material formulation in layers on a supporting structure. The AM apparatus thus dispenses building material formulation in target locations which are to be occupied and leaves other target locations void. The apparatus typically includes a plurality of arrays of nozzles, each of which can be configured to dispense a different building material formulation. Thus, different target locations can be occupied by different building material formulations. The types of building material formulations can be categorized into two major categories: modeling material formulation and support material formulation. The support material formulation serves as a supporting matrix or construction for supporting the object or object parts during the fabrication process and/or other purposes, e.g., providing hollow or porous objects. Support constructions may additionally include modeling material formulation elements, e.g. for further support strength.

The modeling material formulation is generally a composition which is formulated for use in additive manufacturing and which is able to form a three-dimensional object on its own, i.e., without having to be mixed or combined with any other substance.

The final three-dimensional object is made of the modeling material formulation or a combination of modeling material formulations or modeling and support material formulations or modification thereof (for example, following solidification, e.g., curing). All these operations are well-known to those skilled in the art of solid freeform fabrication.

In some exemplary embodiments of the invention an object is manufactured by dispensing two or more different modeling material formulations, each material formulation from a different array of nozzles (belonging to the same or different printing heads) of the AM apparatus. In some embodiments, two or more such arrays of nozzles that dispense different modeling material formulations are both located in the same printing head of the AM apparatus. In some embodiments, arrays of nozzles that dispense different modeling material formulations are located in separate printing heads, for example, a first array of nozzles dispensing a first modeling material formulation is located in a first printing head, and a second array of nozzles dispensing a second modeling material formulation is located in a second printing head.

In some embodiments, an array of nozzles that dispense a modeling material formulation and an array of nozzles that dispense a support material formulation are both located in the same printing head. In some embodiments, an array of nozzles that dispense a modeling material formulation and an array of nozzles that dispense a support material formulation are located in separate printing heads.

Figure 1B:
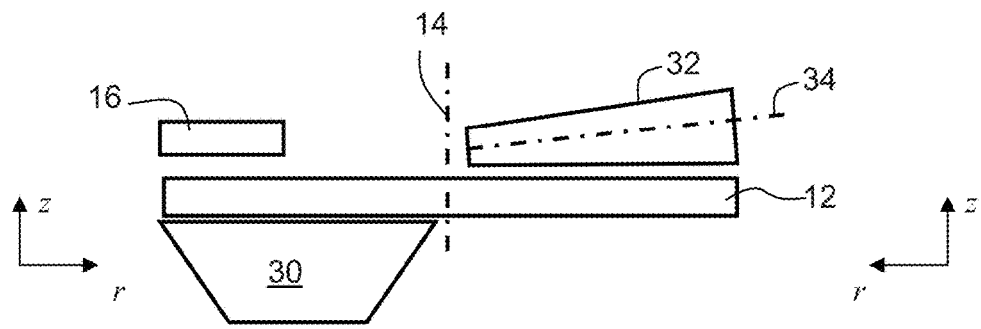
Figure 1C:
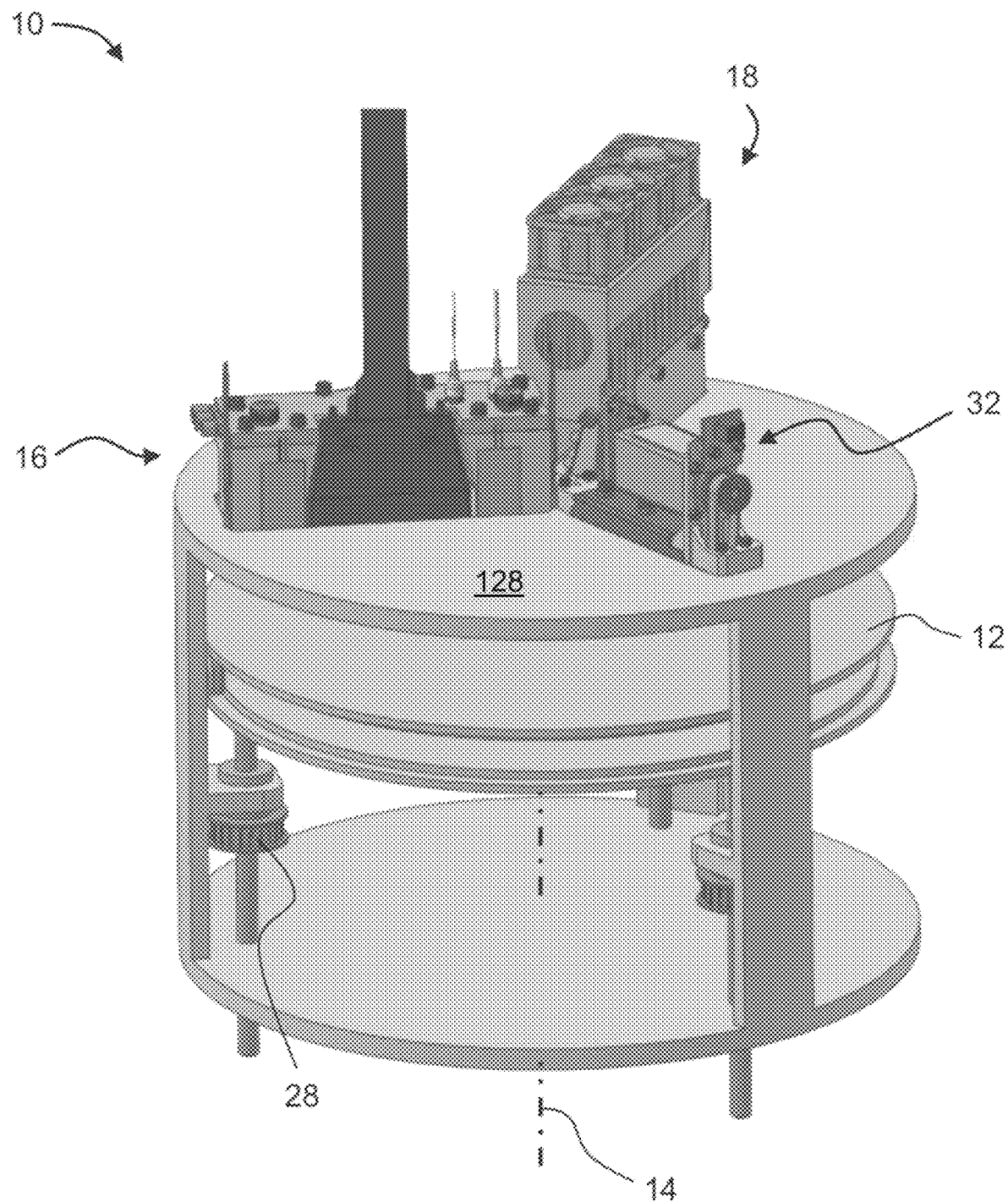

A representative and non-limiting example of a system 10 suitable for AM of an object according to some embodiments of the present invention is illustrated in FIGS. 1A-C. FIGS. 1A-C illustrate a top view (FIG. 1A), a side view (FIG. 1B) and an isometric view (FIG. 1C) of system 10. Preferably, system 10 is a three-dimensional inkjet printing system.

In the present embodiments, system 10 comprises a tray 12 and a plurality of inkjet printing heads 16, each having one or more arrays of nozzles with respective one or more pluralities of separated nozzles. The material used for the three-dimensional printing is supplied to heads 16 by a building material supply system 42.

Each printing head is optionally and preferably fed via one or more building material formulation reservoirs (not shown) which may optionally include a temperature control unit (e.g., a temperature sensor and/or a heating device), and a material formulation level sensor.

To dispense the building material formulation, a voltage signal is applied to the printing heads to selectively deposit droplets of material formulation via the printing head nozzles, for example, as in piezoelectric inkjet printing technology. The dispensing rate of each head depends on the number of nozzles, the type of nozzles and the applied voltage signal rate (frequency). Such printing heads are known to those skilled in the art of solid freeform fabrication.

Tray 12 can have a shape of a disk or it can be annular. Non-round shapes are also contemplated.

Tray 12 and heads 16 are optionally and preferably mounted such as to allow a relative rotary motion between tray 12 and heads 16. This can be achieved by (i) configuring tray 12 to rotate about a vertical axis 14 relative to heads 16, (ii) configuring heads 16 to rotate about vertical axis 14 relative to tray 12, or (iii) configuring both tray 12 and heads 16 to rotate about vertical axis 14 but at different rotation velocities (e.g., rotation at opposite direction). While some embodiments of system 10 are described below with a particular emphasis to configuration (i) wherein the tray is a rotary tray that is configured to rotate about vertical axis 14 relative to heads 16, it is to be understood that the present application contemplates also configurations (ii) and (iii) for system 10. Any one of the embodiments of system 10 described herein can be adjusted to be applicable to any of configurations (ii) and (iii), and one of ordinary skills in the art, provided with the details described herein, would know how to make such adjustment. Further, while some embodiments of system 10 are described below with a particular emphasis to rotary AM systems, the present disclosure also contemplates embodiments in which the AM system is non-rotary, wherein the relative motion between the heads and the tray is translational, e.g., along straight lines. Representative examples of such an AM system that is suitable for some embodiments are found in U.S. Pat. No. 10,611, 136, the contents of which are hereby incorporated by reference.

In the following description, a direction parallel to tray 12 and pointing outwardly from axis 14 is referred to as the radial direction r, a direction parallel to tray 12 and perpendicular to the radial direction r is referred to herein as the azimuthal direction $\varphi$, and a direction perpendicular to tray 12 is referred to herein is the vertical direction z.

Generally, as will be explained below, the rotatory motion between the tray and the printing head(s) of the system allows the heads to scan the tray along the azimuthal direction while dispensing building material thereon. Thus, the azimuthal direction is interchangeably referred to herein as the "scanning direction". Typically, the printing head(s) comprise an array of nozzles that are at an angle (typically a right angle) to the scanning direction, so that a particular printing head can dispense several rows of building material, each row extending along the scanning direction. Thus, the radial direction is interchangeably referred to herein as the "indexing direction", indicating that the rows can be indexed along this direction.

It is appreciated, that when the AM system is non-rotary, there is no radial and azimuthal directions. Yet, in non-rotary systems a printing head with an array of nozzles can still scan the tray to form rows of building material. Thus, a similar terminology is also used for non-rotary systems, wherein the direction along which the head scans the tray is referred to as the "scanning direction" and the horizontal direction that perpendicular to the scanning direction is referred to as the "indexing direction." Oftentimes in the literature, the scanning direction is referred to as the X direction and the indexing direction is referred to as the Y direction.

The term "radial position," as used herein, refers to a position on or above tray 12 at a specific distance from axis 14. When the term is used in connection to a printing head, the term refers to a position of the head which is at specific distance from axis 14. When the term is used in connection to a point on tray 12, the term corresponds to any point that belongs to a locus of points that is a circle whose radius is the specific distance from axis 14 and whose center is at axis 14.

The term "azimuthal position," as used herein, refers to a position on or above tray 12 at a specific azimuthal angle relative to a predetermined reference point. Thus, radial position refers to any point that belongs to a locus of points that is a straight line forming the specific azimuthal angle relative to the reference point.

The term "vertical position," as used herein, refers to a position over a plane that intersect the vertical axis 14 at a specific point.

Tray 12 serves as a building platform for three-dimensional printing. The working area on which one or objects are printed is typically, but not necessarily, smaller than the total area of tray 12. In some embodiments of the present invention the working area is annular. The working area is shown at 26. In some embodiments of the present invention tray 12 rotates continuously in the same direction throughout the formation of object, and in some embodiments of the present invention tray reverses the direction of rotation at least once (e.g., in an oscillatory manner) during the formation of the object. Tray 12 is optionally and preferably removable. Removing tray 12 can be for maintenance of system 10, or, if desired, for replacing the tray before printing a new object. In some embodiments of the present invention system 10 is provided with one or more different replacement trays (e.g., a kit of replacement trays), wherein two or more trays are designated for different types of objects (e.g., different weights) different operation modes (e.g., different rotation speeds), etc. The replacement of tray 12 can be manual or automatic, as desired. When automatic replacement is employed, system 10 comprises a tray replacement device 36 configured for removing tray 12 from its position below heads 16 and replacing it by a replacement tray (not shown). In the representative illustration of FIG. 1A tray replacement device 36 is illustrated as a drive 38 with a movable arm 40 configured to pull tray 12, but other types of tray replacement devices are also contemplated.

Exemplified embodiments for the printing head 16 are illustrated in FIGS. 2A-2C. These embodiments can be employed for any of the AM systems described above, including, without limitation, rotary system 10 and non-rotary systems.

FIGS. 2A-B illustrate a printing head 16 with one (FIG. 2A) and two (FIG. 2B) nozzle arrays 22. The nozzles in the array are preferably aligned linearly, along a straight line. In embodiments in which a particular printing head has two or more linear nozzle arrays, the nozzle arrays are optionally and preferably can be parallel to each other. When a printing head has two or more arrays of nozzles (e.g., FIG. 2B) all arrays of the head can be fed with the same building material formulation, or at least two arrays of the same head can be fed with different building material formulations.

When a non-rotary system with multiple printing heads is employed, all printing heads are optionally and preferably oriented along the indexing direction with their positions along the scanning direction being offset to one another.

When a system similar to system 10 is employed, all printing heads 16 are optionally and preferably oriented radially (parallel to the radial direction) with their azimuthal positions being offset to one another. Thus, in these embodiments, the nozzle arrays of different printing heads are not parallel to each other but are rather at an angle to each other, which angle being approximately equal to the azimuthal offset between the respective heads. For example, one head can be oriented radially and positioned at azimuthal position $\varphi_1$, and another head can be oriented radially and positioned at azimuthal position $\varphi_2$. In this example, the azimuthal offset between the two heads is $\varphi_1$-$\varphi_2$, and the angle between the linear nozzle arrays of the two heads is also $\varphi_1$-$\varphi_2$.

In some embodiments, two or more printing heads can be assembled to a block of printing heads, in which case the printing heads of the block are typically parallel to each other. A block including several inkjet printing heads 16a, 16b, 16c is illustrated in FIG. 2C.

In some embodiments, system 10 comprises a stabilizing structure 30 positioned below heads 16 such that tray 12 is between stabilizing structure 30 and heads 16. Stabilizing structure 30 may serve for preventing or reducing vibrations of tray 12 that may occur while inkjet printing heads 16 operate. In configurations in which printing heads 16 rotate about axis 14, stabilizing structure 30 preferably also rotates such that stabilizing structure 30 is always directly below heads 16 (with tray 12 between heads 16 and tray 12).

Tray 12 and/or printing heads 16 is optionally and preferably configured to move along the vertical direction z, parallel to vertical axis 14 so as to vary the vertical distance between tray 12 and printing heads 16. In configurations in which the vertical distance is varied by moving tray 12 along the vertical direction, stabilizing structure 30 preferably also moves vertically together with tray 12. In configurations in which the vertical distance is varied by heads 16 along the vertical direction, while maintaining the vertical position of tray 12 fixed, stabilizing structure 30 is also maintained at a fixed vertical position.

The vertical motion can be established by a vertical drive 28. Once a layer is completed, the vertical distance between tray 12 and heads 16 can be increased (e.g., tray 12 is lowered relative to heads 16) by a predetermined vertical step, according to the desired thickness of the layer subsequently to be printed. The procedure is repeated to form a three-dimensional object in a layerwise manner.

The operation of inkjet printing heads 16 and optionally and preferably also of one or more other components of system 10, e.g., the motion of tray 12, are controlled by a controller 20. The controller can have an electronic circuit and a non-volatile memory medium readable by the circuit, wherein the memory medium stores program instructions which, when read by the circuit, cause the circuit to perform control operations as further detailed below.

Controller 20 can also communicate with a host computer 24 which transmits digital data pertaining to fabrication instructions based on computer object data, e.g., in a form of a Standard Tessellation Language (STL) or a StereoLithography Contour (SLC) format, Virtual Reality Modeling Language (VRML), Additive Manufacturing File (AMF) format, Drawing Exchange Format (DXF), Polygon File Format (PLY) or any other format suitable for Computer-Aided Design (CAD). The object data formats are typically structured according to a Cartesian system of coordinates. In these cases, computer 24 preferably executes a procedure for transforming the coordinates of each slice in the computer object data from a Cartesian system of coordinates into a polar system of coordinates. Computer 24 optionally and preferably transmits the fabrication instructions in terms of the transformed system of coordinates. Alternatively, computer 24 can transmit the fabrication instructions in terms of the original system of coordinates as provided by the computer object data, in which case the transformation of coordinates is executed by the circuit of controller 20.

Figure 3A:
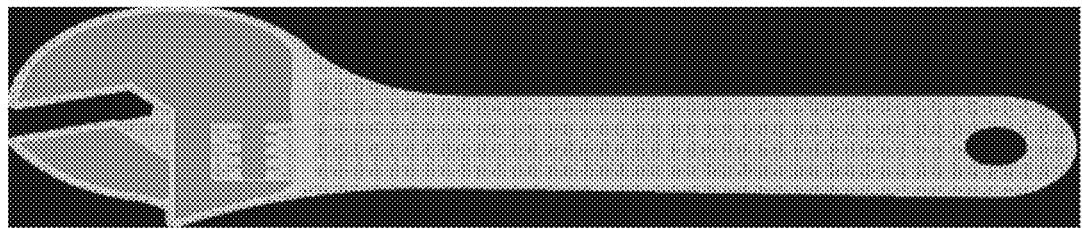
FIGS. 3A and 3B are schematic illustrations demonstrating coordinate transformations according to some embodiments of the present invention.
Figure 3B:
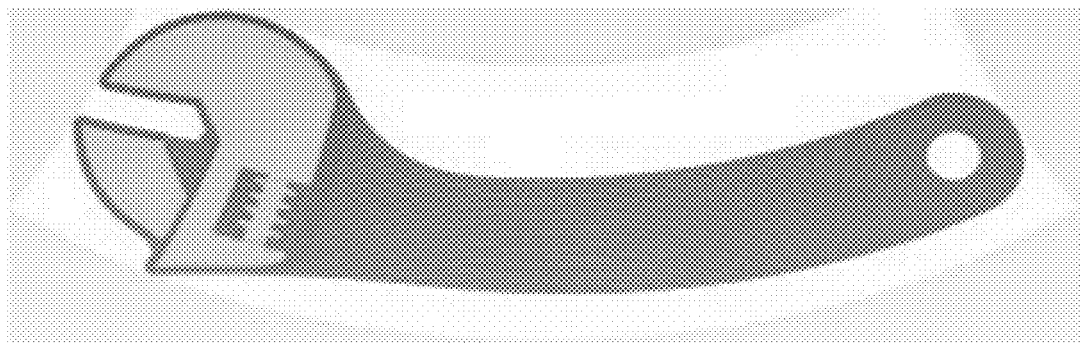

The transformation of coordinates allows three-dimensional printing over a rotating tray. In non-rotary systems with a stationary tray with the printing heads typically reciprocally move above the stationary tray along straight lines. In such systems, the printing resolution is the same at any point over the tray, provided the dispensing rates of the heads are uniform. In system 10, unlike non-rotary systems, not all the nozzles of the head points cover the same distance over tray 12 during at the same time. The transformation of coordinates is optionally and preferably executed so as to ensure equal amounts of excess material formulation at different radial positions. Representative examples of coordinate transformations according to some embodiments of the present invention are provided in FIGS. 3A-B, showing three slices of an object (each slice corresponds to fabrication instructions of a different layer of the objects), where FIG. 3A illustrates a slice in a Cartesian system of coordinates and FIG. 3B illustrates the same slice following an application of a transformation of coordinates procedure to the respective slice.

Typically, controller 20 controls the voltage applied to the respective component of the system 10 based on the fabrication instructions and based on the stored program instructions as described below.

Generally, controller 20 controls printing heads 16 to dispense, during the rotation of tray 12, droplets of building material formulation in layers, such as to print a three-dimensional object on tray 12.

The inkjet printing heads dispense layers of building material via inkjet technology. Each of the printing heads can be configured to dispense a different building material. When a particular printing head comprises two or more nozzle arrays, each nozzle array can be configured to dispense a different building material. Thus, different target locations can be occupied by different building materials.

The type of material that is conveyed to each nozzle array of each printing head for dispensing is optionally and preferably controlled by controller 20. For example, controller 20 can signal a building material supply system 42 to supply a first modeling material to one nozzle array of a first head and a support material to another nozzle array of the first head. Controller 20 can also signal system 42 to supply the first modeling material to one nozzle array of the first head, the support material to another nozzle array of the first head, and a second modeling material to one nozzle array of a second head. Alternatively, controller 20 can signal system 42 to supply the support material to a nozzle array of another head. Controller 20 can also signal system 42 to supply the first modeling material to one nozzle array of the first head, the support material to another nozzle array of the first head, the second modeling material to one nozzle array of the second head, and a third modeling material to another nozzle array of the second head, and so on.

System 10 optionally and preferably comprises a solidification system 18 for solidifying (e.g., curing) the building material formulation. Solidification system 18 can comprise one or more radiation sources 18, which can be, for example, an ultraviolet or visible or infrared lamp, or other sources of electromagnetic radiation, or electron beam source, depending on the modeling material formulation being used. Radiation source can include any type of radiation emitting device, including, without limitation, light emitting diode (LED), digital light processing (DLP) system, resistive lamp and the like. In various exemplary embodiments of the invention the operation of solidification system 18 is controlled by controller 20 which may activate and deactivate solidification system 18. When solidification system comprises a radiation source, controller 20 optionally also control the amount of radiation generated by the radiation source.

In some embodiments of the present invention radiation source 18 is configured to reciprocally move relative to tray along the radial direction r. These embodiments are useful when the length of radiation source 18 is shorter than the width along the radial direction of the working area 26 on tray 12. The motion of radiation source 18 along the radial direction is optionally and preferably controlled by controller 20. Thus, the present embodiments contemplate a radiation source and a printing head, each being independently controllable to move in the radial direction along a separate motion stage. This is unlike conventional three-dimensional printing systems in which the printing head and radiation source are mounted on the same printing block and are therefore forced to move simultaneously. In some embodiments of the invention controller 20 is configured to move radiation source 18 and head(s) 16 non-simultaneously along the radial direction during the operation of system 10. In some embodiments of the invention controller 20 is configured to move radiation source 18 and head(s) 16 non-simultaneously independently along the radial direction during the operation of system 10. These embodiments are particularly useful when it is desired to select the time at which solidification (e.g., curing) is initiated, for example, to delay the solidification.

In some embodiments of the invention, system 10 further comprises one or more leveling devices 32 which can be manufactured as a roller or a blade. Leveling device 32 serves to straighten the newly formed layer prior to the formation of the successive layer thereon. In some embodiments, leveling device 32 has the shape of a conical roller positioned such that its symmetry axis 34 is tilted relative to the surface of tray 12 and its surface is parallel to the surface of the tray. This embodiment is illustrated in the side view of system 10 (FIG. 1B). The conical roller can have the shape of a cone or a conical frustum.

The operation of leveling device 32 is optionally and preferably controlled by controller 20 which may activate and deactivate leveling device 32 and may optionally also control its position along a vertical direction (parallel to axis 14) and/or a radial direction (parallel to tray 12 and pointing toward or away from axis 14.

The printing head(s) 16, the solidification system 18, and optionally and preferably also the leveling device(s) 32 form a printing block of system 10, and are typically mounted on a structure such as a frame 128.

In some embodiments of the present invention printing heads 16 are configured to reciprocally move relative to tray along the radial direction r. These embodiments are useful when the lengths of the nozzle arrays 22 of heads 16 are shorter than the width along the radial direction of the working area 26 on tray 12. The motion of heads 16 along the radial direction is optionally and preferably controlled by controller 20.

Some embodiments contemplate the fabrication of an object by dispensing different material formulations from different arrays of nozzles (belonging to the same or different printing head). These embodiments provide, inter alia, the ability to select material formulations from a given number of material formulations and define desired combinations of the selected material formulations and their properties. According to the present embodiments, the spatial locations of the deposition of each material formulation with the layer is defined, either to effect occupation of different three-dimensional spatial locations by different material formulations, or to effect occupation of substantially the same three-dimensional location or adjacent three-dimensional locations by two or more different material formulations so as to allow post deposition spatial combination of the material formulations within the layer, thereby to form a composite material formulation at the respective location or locations.

Any post deposition combination or mix of modeling material formulations is contemplated. For example, once a certain material formulation is dispensed it may preserve its original properties. However, when it is dispensed simultaneously with another modeling material formulation or other dispensed material formulations which are dispensed at the same or nearby locations, a composite material formulation having a different property or properties to the dispensed material formulations may be formed.

In some embodiments of the present invention the system dispenses digital material for at least one of the layers.

The phrase "digital materials", as used herein and in the art, describes a combination of two or more materials on a pixel level or voxel level such that pixels or voxels of different materials are interlaced with one another over a region. Such digital materials may exhibit new properties that are affected by the selection of types of materials and/or the ratio and relative spatial distribution of two or more materials.

As used herein, a "voxel" of a layer refers to a physical three-dimensional elementary volume within the layer that corresponds to a single pixel of a bitmap describing the layer. The size of a voxel is approximately the size of a region that is formed by a building material, once the building material is dispensed at a location corresponding to the respective pixel, leveled, and solidified.

The present embodiments thus enable the deposition of a broad range of material formulation combinations, and the fabrication of an object which may consist of multiple different combinations of material formulations, in different parts of the object, according to the properties desired to characterize each part of the object.

It is expected that during the life of a patent maturing from this application many relevant AM systems will be developed and the scope of the term AM system is intended to include all such new technologies a priori.

Following the completion of the printing process object, the printed object is removed from the tray. Since the bottommost layer of the object is typically attached to the tray, removal of the printed object typically involves the use of a scraper or a similar tool. In three-dimensional printing systems in which the tray is rotary (e.g., system 10), it is difficult to remove the object while the tray is free to rotate since the scraping operation moves the tray. It is therefore desired to have a locking mechanism that locks the tray from moving during removal of the objects. It is also desirable to have a locking mechanism that locks the tray from moving during maintenance of different components of the system.

The inventors found that while a locking mechanism is advantageous for the reasons stated above, the use of a locking mechanism is susceptible to human errors (e.g., failing to unlock the tray before commencing a new printing job) that would best be avoided. The inventors have therefore devised a safety system for a rotary tray of a three-dimensional printing system, such as, but not limited to, the rotary tray 12 of system 10.

Figure 4A:
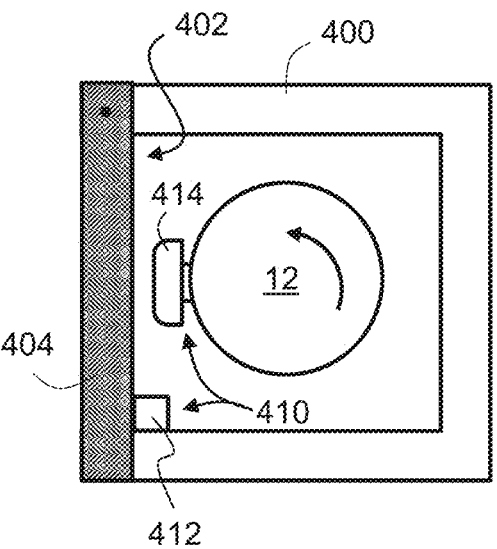
FIGS. 4A-4D are schematic illustrations showing a top view (FIGS. 4A and 4B) and a side view (FIGS. 4C and 4D) of a printing chamber, a rotary tray, and a latch, according to some embodiments of the present invention.
Figure 4B:
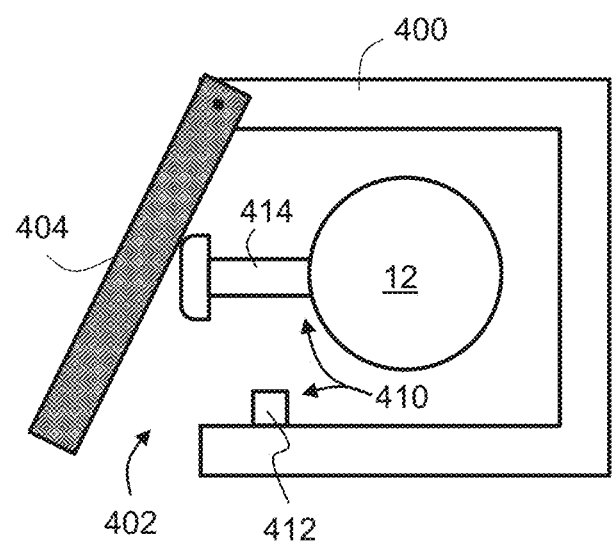
Figure 4C:
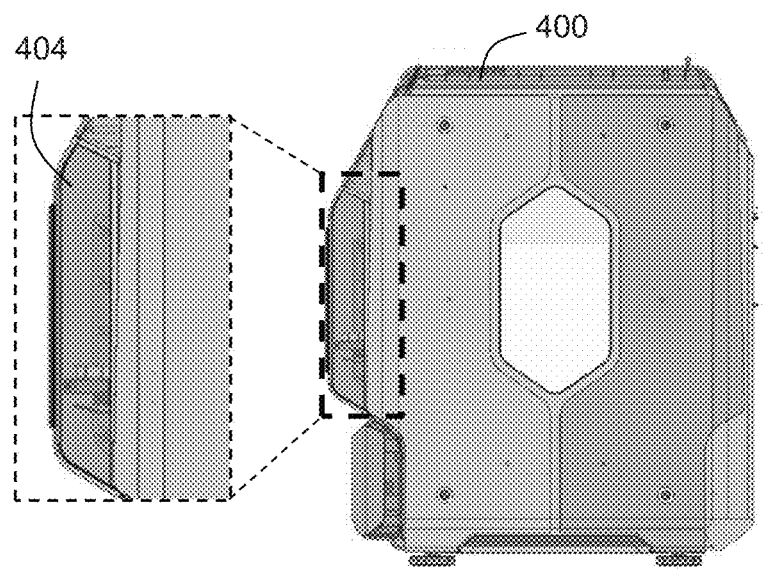
Figure 4D:
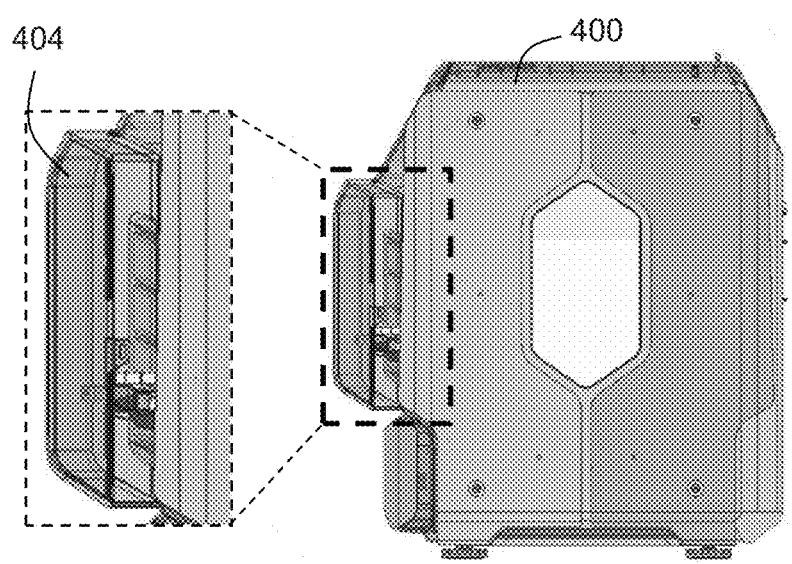

FIGS. 4A and 4B are schematic illustrations showing a top view of a printing chamber 400 having an access opening 402, and a door 404 at access opening 402. Printing chamber 400 is dimensionally designed to contain the rotary tray 12, and optionally and preferably also other components of the printing system, such as the printing block or frame 128 (not shown in FIGS. 4A and 4B, see FIG. 1C) as further detailed hereinabove. Door 404 is preferably a rotating door, as illustrated in FIGS. 4A and 4B, but in some embodiments of the present invention, the door can be a sliding door. A safety system 410 is introduced in chamber 400, which safety system 410 comprises a door state sensor 412, configured for generating a signal indicating whether door 404 is open or closed, and a latch 414 which is constructed to assume a locked state (FIG. 4B) in which latch 414 prevents door 404 from closing and tray 12 from rotating, and an unlocked state (FIG. 4A) in which latch 414 allows door 404 to close and the tray to rotate. Side views of printing chamber 400 in a closed state and an open state of door 404 are illustrated in FIGS. 4C and 4D, respectively.

Latch 414 is preferably a manually operated latch. In the preferred configuration illustrated in FIGS. 4A and 4B, latch 414 reciprocally slides radially with respect to the tray 12, wherein when latch 414 is retracted inwardly latch 414 assumes the unlocked state, and when latch 414 is extracted outwardly latch 414 assumes the locked state. For example, as illustrated in FIG. 4B, latch 414 can protrude out of access opening 402 when extracted outwardly, thereby preventing door 404 from closing. In other embodiments, latch 414 can be constructed to pivot rather than to slide radially. Latch 414 can also be configured to prevent the door from closing indirectly by actuating a mechanism (not shown) that locks the door's hinge.

Door state sensor 412 can be of any type, including, without limitation, a magnetic sensor, an optical sensor, and an electromechanical switch. The signal generated by sensor 412 is preferably transmitted to the controller of the printing system (not shown, see, e.g., controller 20 in FIG. 1A). In response to this signal, the controller activates or deactivates the various components of the three-dimensional printing system. For example, when the signal from sensor 412 indicates that the door is open, the controller can deactivate all printing operations, including the deactivation of the nozzle arrays 16, the leveling device 32 and the solidification system 18.

Thus, the combined operations of sensor 412 and latch 414 of safety system 410 provide the printing system 10 with additional safety measures, since latch 414 maintains the door 404 open while tray 12 is locked, and the signal generated by sensor 412 ensures that when the door is open the controller does not resume or initiate a printing job.

Figure 5A:
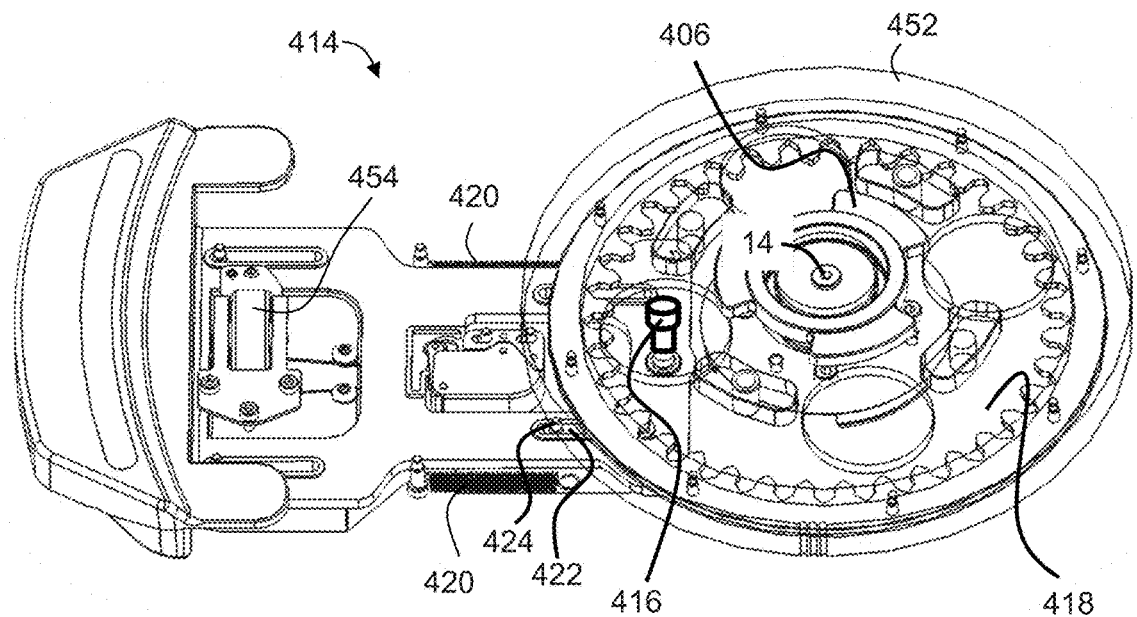
FIGS. 5A-C are schematic illustrations showing perspective views of a latch for locking and unlocking a rotary tray according to some embodiments of the present invention.
Figure 5B:
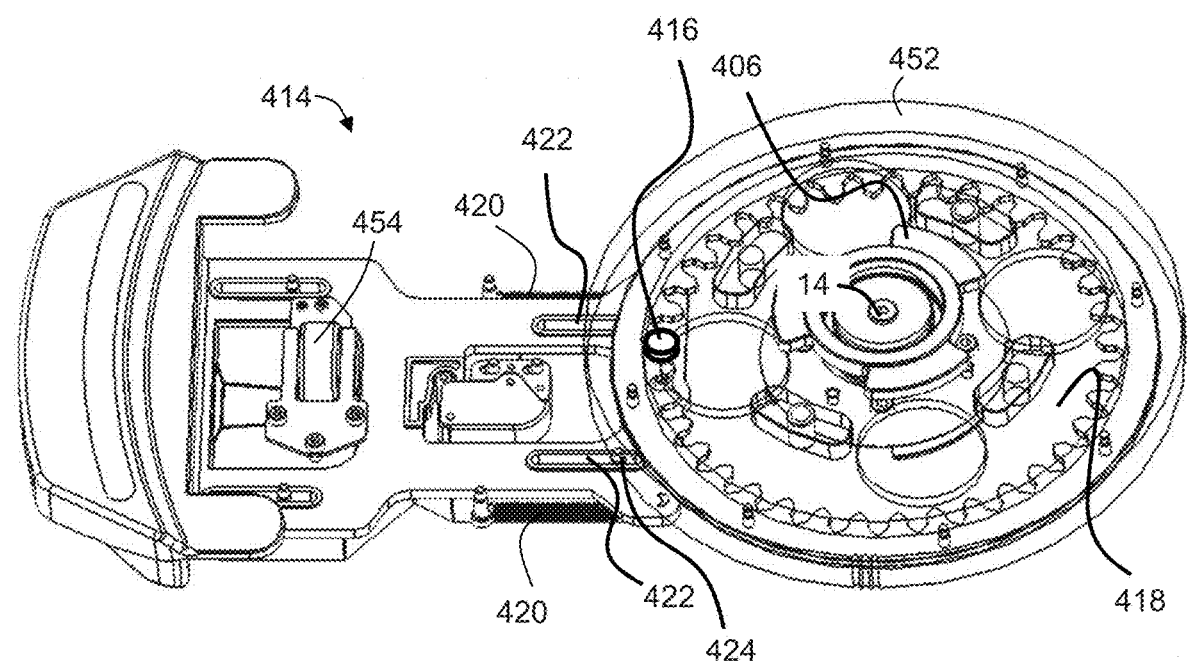
Figure 5C:
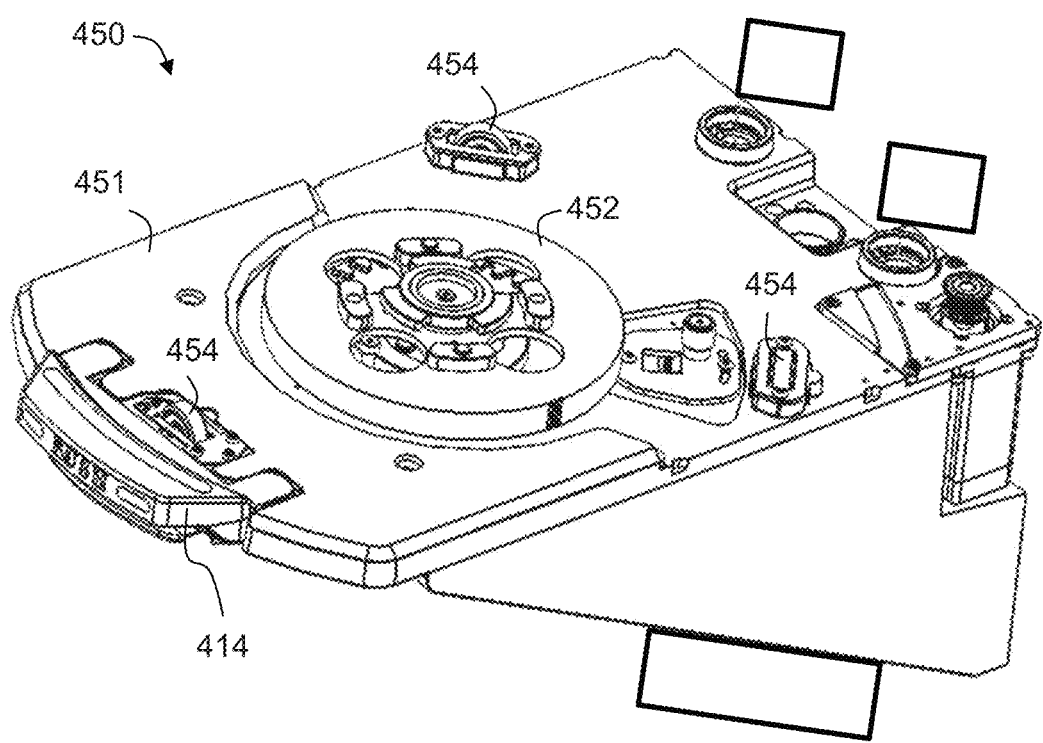

FIGS. 5A-C are schematic illustrations showing perspective views of latch 414, in the unlocked (FIGS. 5A and 5C) and locked (FIG. 5B) states, according to some embodiments of the present invention. FIGS. 5A and 5B also illustrate a platter 452 for carrying tray 12 (not shown) with a nut 406 fixing the center of platter 452 to its position at the rotation axis 14. FIG. 5C shows a perspective view of a platform 450, carrying platter 452, and having a driving board 451 carrying latch 414. Platform 450 is configured to rotate platter 452, and consequently also tray 12 once mounted thereon, and also to move in the vertical direction as further detailed hereinabove.

Latch 414 comprises a two or more slide slots 422 that slide over respective secured pins 424, facilitating the reciprocal motion of latch 414 along the radial direction. Pins 424 can be secured, for example, to the driving board 451 of platform 450 (see FIG. 5C). Latch 414 optionally and preferably comprises a lock member 416 that can engage and be disengaged from platter 452. Lock member can have the shape of pillar and be embodied, e.g., as a pin or a screw. In the unlocked state (FIG. 5A), lock member 416 is disengaged from platter 452, thereby allowing platter 452 and tray 12 to rotate. In the locked state (FIG. 5B), lock member 416 engages platter 452 in a manner that prevents platter 452 and tray 12 from rotating. Preferably, a sprocket wheel 418 is connected to the tray to rotate therewith. In these embodiments, lock member 416 engages sprocket wheel 418 in the locked state, and disengages from sprocket wheel 416 in the unlocked state.

Platform 450 preferably comprises one or more supporting rollers 454 for supporting tray 12 during its rotation. The inventors found that it is advantageous to have at least one of the supporting rollers 454 under the tray below the leveling device (not shown see FIGS. 1A-C), for absorbing a force applied by the leveling device. An additional supporting roller 454 is optionally and preferably mounted on latch 414.

In some embodiments of the present invention safety system 410 comprises one or more springs 420 arranged to bias latch 414 to maintain the locked state upon activation of latch 414. Preferably, latch 414 is a push-push latch, so that when latch 414 is in its unlocked state, a small movement of latch 414 inwardly (over-pushing), releases the springs 420 that in turn move latch 414 outwardly and there is no need to apply manual force outwardly. To return latch 414 from its locked state to its unlocked states, a force is applied to latch 414, against the forces of the springs 420, throughout the displacement length of latch 414 from the extracted position to the retracted position.

The advantage of constructing the springs 420 to bias latch 414 to maintain the locked state upon activation of latch 414, is that since the springs 420 apply the force outwardly, they prevent the door 404 from being closed, thereby indirectly preventing the printing job from commencing or resuming while the tray is locked. In tests performed by the inventors, it was unexpectedly found that during some operations, application of a firm force on the door may result in a situation in which the door is closed but the tray is still locked. In such a situation the controller, which receives a signal indicating that the door is closed, may commence or resume the printing job while the tray is not rotating. Even is controller does receive indication the tray is not rotating (e.g., from other sensors of the printing system), it may generate an alert message and require the user to run a security maintenance check, which would best be avoided.

To overcome this problem, the inventors devised a double lock safety principle that prevents the door from being closed while latch 414 is in its extracted position. The double lock safety principle will now be explained with reference to FIG. 6A-C.

Figure 6A:
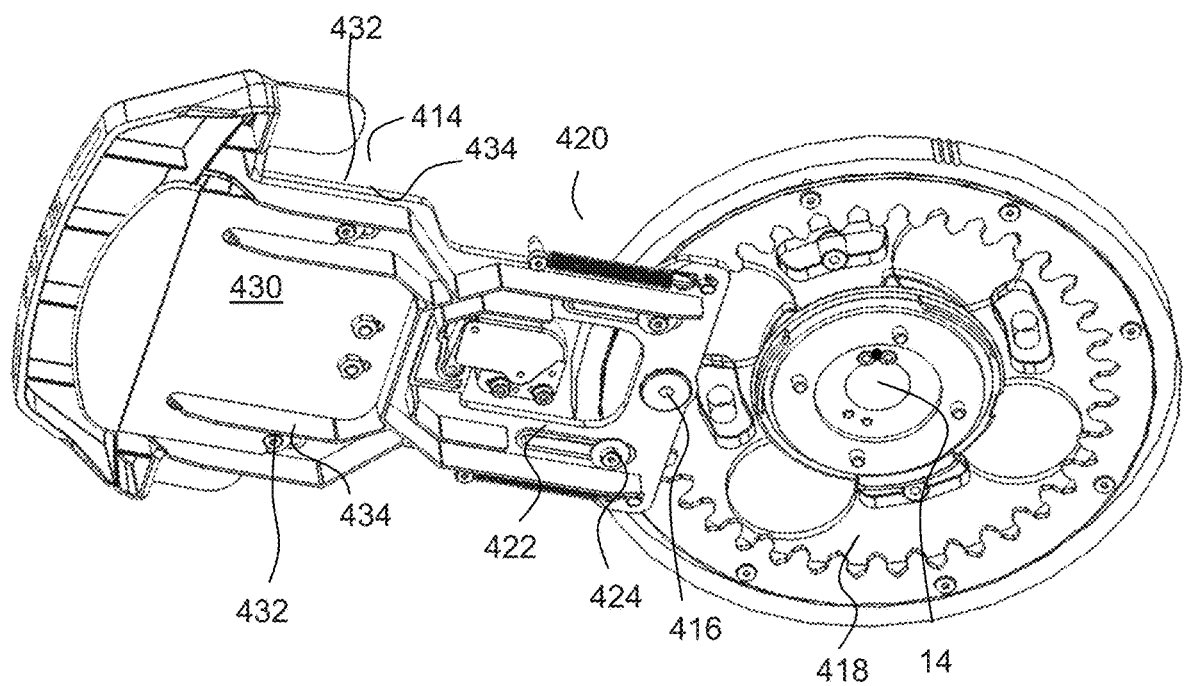
FIG. 6A-C are schematic illustrations showing a perspective bottom view (FIG. 6A) and side views (FIGS. 6B and 6C) of a latch for locking and unlocking a rotary tray according to some embodiments of the present invention.
Figure 6B:
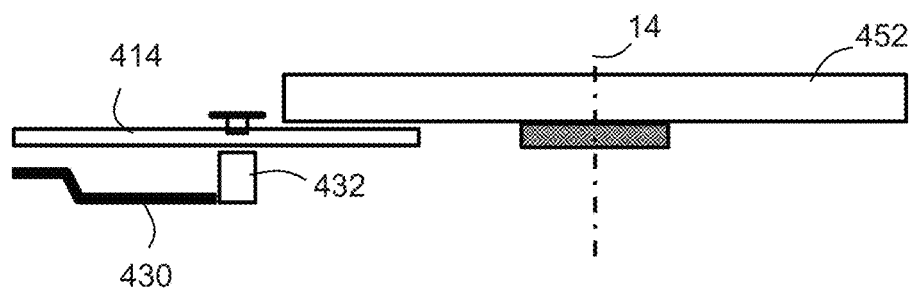
Figure 6C:
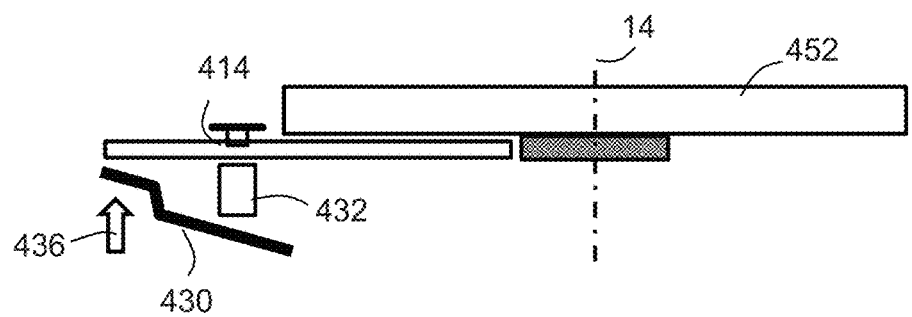

FIGS. 6A-C are schematic illustrations showing a perspective bottom view (FIG. 6A) and side views (FIGS. 6B and 6C) of latch 414 according to some embodiments of the present invention. Shown is latch 414 in its extracted (FIGS. 6A and 6B), and retracted (FIG. 6C) positions.

In the illustrated embodiment, an elastic lever 430 is connected to latch 414 (at its bottom side, in the present example). Lever 430 can be embodied, for example, by a plate, such as, but not limited to, a metal plate. A stopper element 432, such as a screw or the like can be mounted at a fixed radial distance from the vertical axis 14, for example, on driving board 451 of platform 450 (FIG. 5C). In some embodiments of the present invention stopper element 432 passes through slide slots 422 or one or more additional slide slots 434 formed in latch 414, so that stopper element 430 remains fixed when latch 414 slides. When lever 430 is in a relaxed state (FIGS. 6A and 6B) a force applied to latch 414 inwardly results in a collision between lever 430 and stopper element 432, preventing latch 414 from retracting and assuming its unlocked state. FIG. 6C illustrates lever 430 in a strained state, after a force 436 is applied to its distal end upwardly. In this state, lever 430 bypasses stopper element 432, allowing latch 414 to retract and assume its unlocked state.

Figure 7:
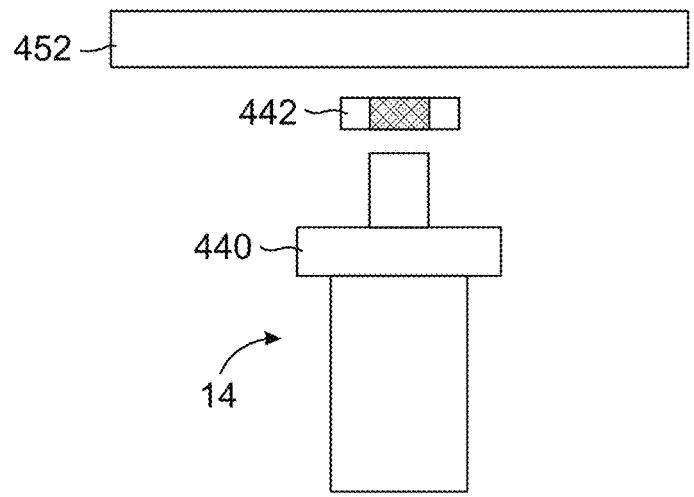
FIG. 7 is a schematic illustration showing an exploded view of a platter on a vertical axis, according to some embodiments of the present invention.

FIG. 7 is a schematic illustration showing an exploded view of platter 452 on vertical axis 14, according to some embodiments of the present invention. Axis 14 optionally and preferably is formed with a central shoulder 440 supporting platter 452. Typically, platter 452 is fixed on shoulder 440 by means of a horseshoe spring 442. The inventors found that stresses applied to platter 452 during the removal of the printed object from platter 452, deflects horseshoe spring 442. The inventors unexpectedly discovered that in time these occasional deflections become permanent, and that such permanent deflection affects the centrality and/or planarity of the rotation of the tray and reduces the print quality.

Figure 8A:
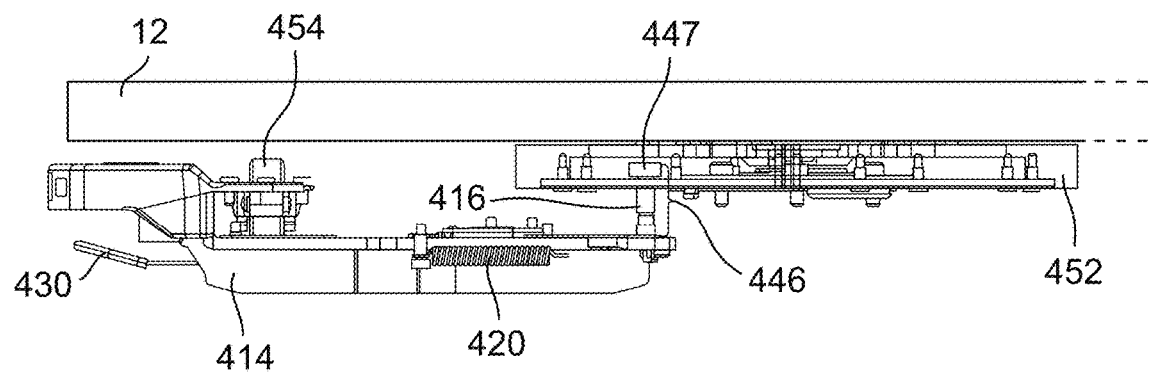
FIGS. 8A and 8B are schematic illustrations showing a lock member that supports a platter, according to some embodiments of the present invention.
Figure 8B:
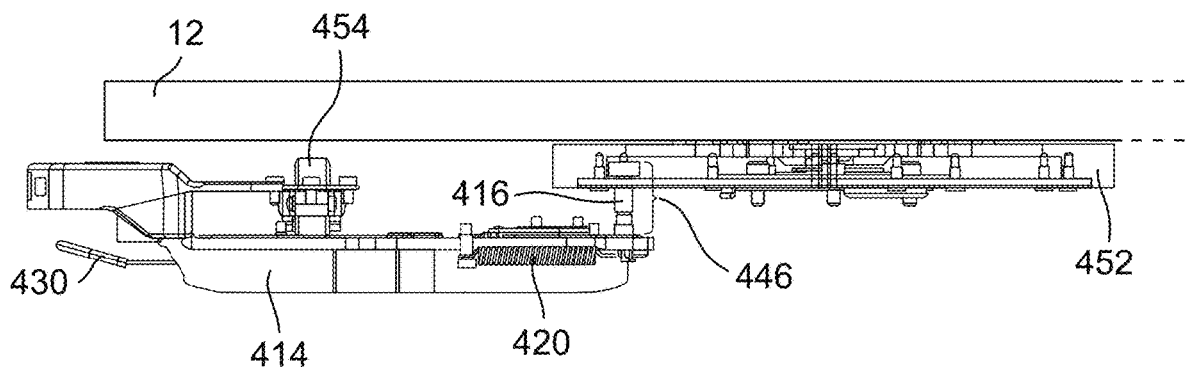

The inventors found that latch 414 can also be utilized to reduce the stress on horseshoe spring 442, hence improve the print quality of system 10. This embodiment is schematically illustrated in FIGS. 8A and 8B, showing latch 414 in its unlocked (FIG. 8A) and locked (FIG. 8B) states. In these embodiments, lock member 416 is provided with a widened head 447, such as a screw head, and the height 446 of lock member 416 and its head 447 is selected to support platter 452 in the locked state. This reduces the stress on axis 14 and consequently horseshoe spring 442 while platter 452 is locked, since vertical forces applied, for example, by the user during the removal of the object from the tray, are distributed between horseshoe spring 442 and lock member 416. The inventors found that this significantly increases the lifetime of spring 442. Preferably, the height 446 of lock member is selected to support platter 452 in the locked state but not in the unlocked state. This can be achieved, for example, by providing a platter having a profile that is not planar at its bottom side. Specifically, in these embodiments platter 452 has thickness that is larger at its periphery than at or near its center, so that when latch 414 is extracted, lock member 416 supports the thicker peripheral part of the platter 452, and latch 414 is retracted, there is a gap between the head 447 and the thinner non-peripheral part of platter 452.

As used herein the term "about" or "approximately" refers to ±10%.

The word "exemplary" is used herein to mean "serving as an example, instance or illustration." Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments." Any particular embodiment of the invention may include a plurality of "optional" features unless such features conflict.

The terms "comprises", "comprising", "includes", "including", "having" and their conjugates mean "including but not limited to".

The term "consisting of" means "including and limited to".

The term "consisting essentially of" means that the composition, method or structure may include additional ingredients, steps and/or parts, but only if the additional ingredients, steps and/or parts do not materially alter the basic and novel characteristics of the claimed composition, method or structure.

As used herein, the singular form "a", "an" and "the" include plural references unless the context clearly dictates otherwise. For example, the term "a compound" or "at least one compound" may include a plurality of compounds, including mixtures thereof.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting. In addition, any priority document(s) of this application is/are hereby incorporated herein by reference in its/their entirety.

What is claimed is:

1. A safety system for a rotary tray of a three-dimensional printing system, the printing system having a printing head, a controller, and a printing chamber with an access opening, the safety system comprising
    a door state sensor, configured for transmitting to the controller a signal indicative whether a door at said access opening is open or closed; and
    a latch having a lock member and being operable to assume a locked state in which said latch prevents said door from closing while said lock member prevents the tray from rotating, and an unlocked state in which said latch allows said door to close while said lock member allows the tray to rotate.

2. The system according to claim 1, further comprising a sprocket wheel connected to the tray to rotate therewith, wherein said lock member engages said sprocket wheel in said locked state, and disengages from said sprocket wheel in said unlocked state.

3. The system according to claim 1, wherein said latch is operable to reciprocally slide radially with respect to the tray, wherein when said latch is extracted outwardly said latch assumes said locked state, and when said latch is retracted inwardly said latch assumes said unlocked state.

4. The system according to claim 3, wherein said latch protrudes out of the access opening when extracted outwardly, thereby preventing said door from closing.

5. The system according to claim 1, further comprising a spring constituted to bias said latch to maintain said locked state upon activation of said latch.

6. The system according to claim 1, further comprising an elastic lever connected to said latch in a manner that when said lever is in a relaxed state, said lever collides with a stopper element and prevents said latch from assuming said unlocked state, and when said lever is in a strained state said lever bypasses said stopper element allowing said latch to assume said unlocked state.

7. The system according to claim 1, wherein a height of said lock member is selected to support the tray in said locked state.

8. The system according to claim 1, wherein a height of said lock member is selected to support the tray in said locked state but not in said unlocked state.

9. The system according to claim 1, wherein said latch is a push-push latch.

10. A three-dimensional printing system, comprising a printing head, a rotary tray, a controller, a printing chamber with an access opening, and the safety system according to claim 1.

11. A method of printing a three-dimensional object, comprising:
    receiving three-dimensional printing data corresponding to the shape of the object;
    feeding said data to the three-dimensional printing system of claim 10;
    operating the three-dimensional printing system to print the object;
    opening said door of said printing chamber;

activating said latch to lock said tray; and
removing said object from said tray.

\* \* \* \* \*